United States Patent [19]

McBride

[11] 3,998,322
[45] Dec. 21, 1976

[54] BELTWIPER BLADE
[76] Inventor: D. R. McBride, P.O. Box 94, St. Albans, W. Va. 25177
[22] Filed: Apr. 25, 1975
[21] Appl. No.: 571,733
[52] U.S. Cl. .............................................. 198/497
[51] Int. Cl.² .......................................... B65G 45/00
[58] Field of Search ............ 198/229, 230; 74/230; 15/93 R, 93 C

[56] References Cited
UNITED STATES PATENTS

| | | | |
|---|---|---|---|
| 1,837,276 | 12/1931 | Levin | 198/230 X |
| 2,514,780 | 7/1950 | McGovern | 198/230 |
| 2,885,069 | 5/1959 | Bowen | 198/230 |
| 3,362,525 | 1/1968 | Fehr | 198/230 |
| 3,674,131 | 7/1972 | Matson | 198/230 |
| 3,782,534 | 1/1974 | Holleman | 198/230 |

FOREIGN PATENTS OR APPLICATIONS 58,900    11/1967    Germany ........................ 198/230

*Primary Examiner*—Evon C. Blunk
*Assistant Examiner*—Richard K. Thomson
*Attorney, Agent, or Firm*—Edward G. Atkins

[57] ABSTRACT

An improved conveyor belt cleaner blade has been devised which consists of a number of rows having teeth mounted upon a base. The teeth are arranged such that the teeth having one row oppose the space between the teeth of an adjacent row. A plurality of holes are dispersed between the rows of teeth. Such holes aiding in the disposal of scraped material.

4 Claims, 4 Drawing Figures

BELTWIPER BLADE

BACKGROUND OF THE INVENTION

1. Field of the Invention

This invention relates generally to devices for cleaning conveyor belts that are used to transport particulate matter such as coal, sand, gravel, crushed rock, etc. More particularly this invention relates to novel wiping blades which are designed to wipe clean, as nearly as possible, conveyor belts upon which there has built up a layer or coating of waste material such as rock, sand, etc., called cake during transfer of unprocessed coal. This invention is to be distinguished from the prior art as a novel blade or blade element as opposed to art-known conveyor belt cleaning devices.

2. Description of the Prior Art

The build up of waste materials on conveyor belts designed for particulate hauling has been a long standing problem. In the field of coal transportation to which this invention has particular applicability there accumulates over a period of time a layer of waste material consisting of a find powder of rock, sand and other waste material normally associated with the moving of coal and other raw material. This layer of waste material, sometimes referred to as cake, can build up and interfere with the operation of the conveyor by clogging moving parts. As a solution to the build up of waste material generally on a conveyor belt a number of conveyor belt cleaning devices have been designed and patented. One of the simplest devices consists of a series of blades aligned parallel to each other and transversely across the conveyor belt as shown in West German Patent No. 1,108,137. Other devices, utilizing a single continuous unitary blade concept are described in U.S. Pat. Nos. 3,722,667, 3,267,970, 3,841,470, 3,782,534 and 2,514,780. Other devices utilizing a plurality blade approach may be found in U.S. Pat. Nos. 3,504,786, 3,055,229 and 1,733,456. It is to be noted that in each of these prior art devices the wiper element usually consists of a single, continuous, generally rectangularly shaped blade, or, more simply, a straight edge.

None of the prior art devices have satisfactorily solved the problem of cleaning material such as cake from a conveyor belt. After the straight edge type blade had passed over the belt, a great deal of the material still remained.

SUMMARY OF THE INVENTION

Generally speaking this invention may be summarized as a novel blade for use in conveyor belt cleaners as opposed to conveyor cleaning devices which arrange blades in various configurations using a variation of blade holders. This invention consists of a blade characterized as having a plurality of rows of teeth, usually three, the teeth of each row alternating in such a fashion that the teeth of one row oppose the space between the teeth of an adjacent row. Additionally, between the rows of each teeth, are holes through the blade base through which scraped material may pass. It is to be noted that the diameter of the opening through the blade base increases so that the opening at the bottom of the blade is larger than the opening at the top of the blade base. This arrangement helps to prevent clogging of the holes by the scraped material.

DESCRIPTION OF THE PREFERRED EMBODIMENTS

Figure 1:
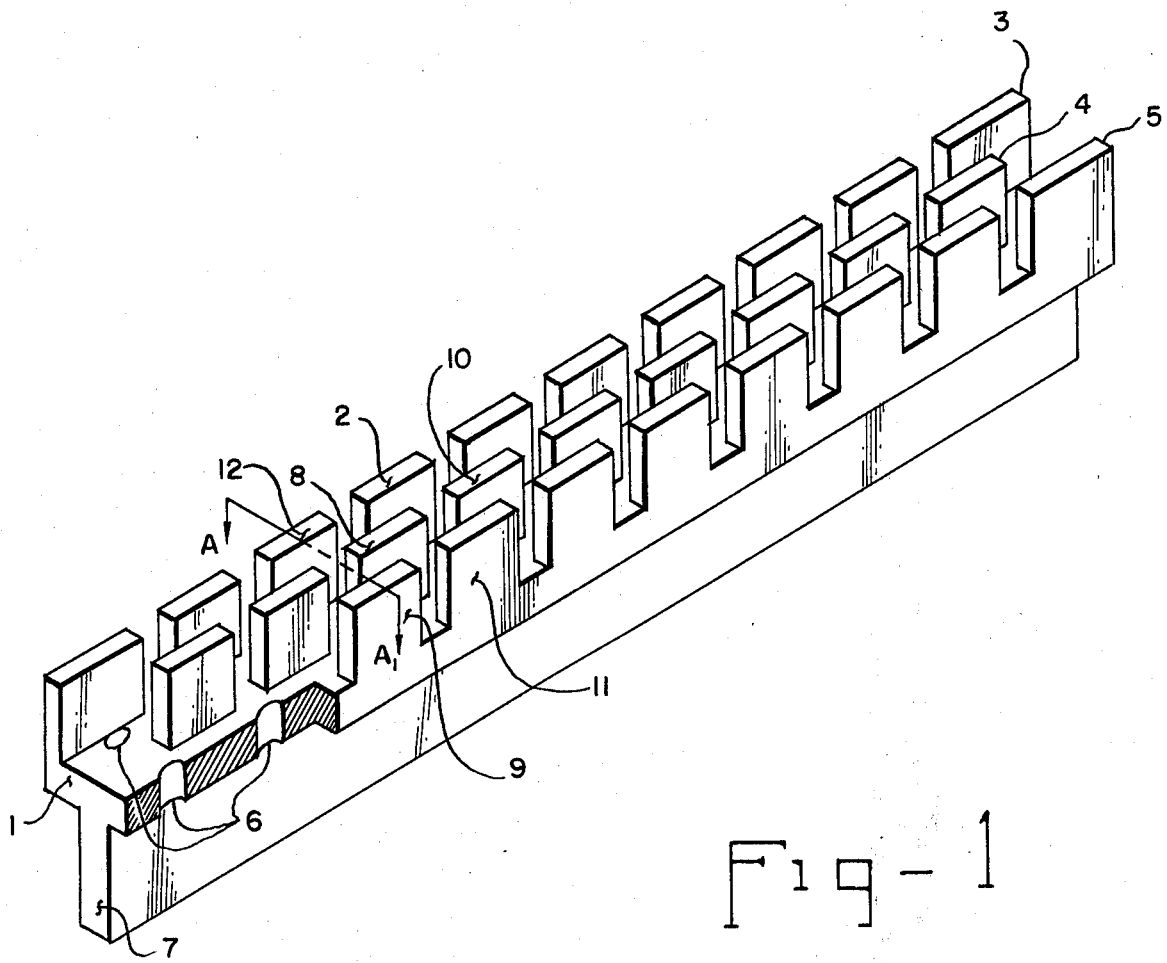
FIG. 1 is a perspective view of the blade the subject of this invention with a portion of the blade shown as cut away to reveal the holes through the base of the blade.

Referring now to FIG. 1, numeral 1 refers to the base of the blade upon which are perpendicularly mounted rows of teeth 3, 4 and 5. The teeth of each row are alternately arranged so that for example, tooth 2 of row 3 opposes the space between teeth 8 and 10 of row 4 and tooth 8 of row 4 oppose the space between teeth 9 and 11 of row 5. The cutaway portion of FIG. 1 shows holes 6 through the base 1. These holes, between teeth rows 3 and 4 and 4 and 5 themselves each form rows with the holes between rows of teeth 4 and 5 located directly behind the teeth of row 5. Holes between rows of teeth 3 and 4 are located directly behind the teeth of row 3. Base member 1 is mounted on base support member 7. This entire blade configuration may be adapted and mounted on any standard conveyor belt cleaning device of the prior art.

The teeth of each of the rows are generally square shaped with the leading edge of each tooth being flat. It is envisioned that this blade with its rows of teeth will be manufactured as a single unit such as from a mold designed for that purpose.

Figure 2:
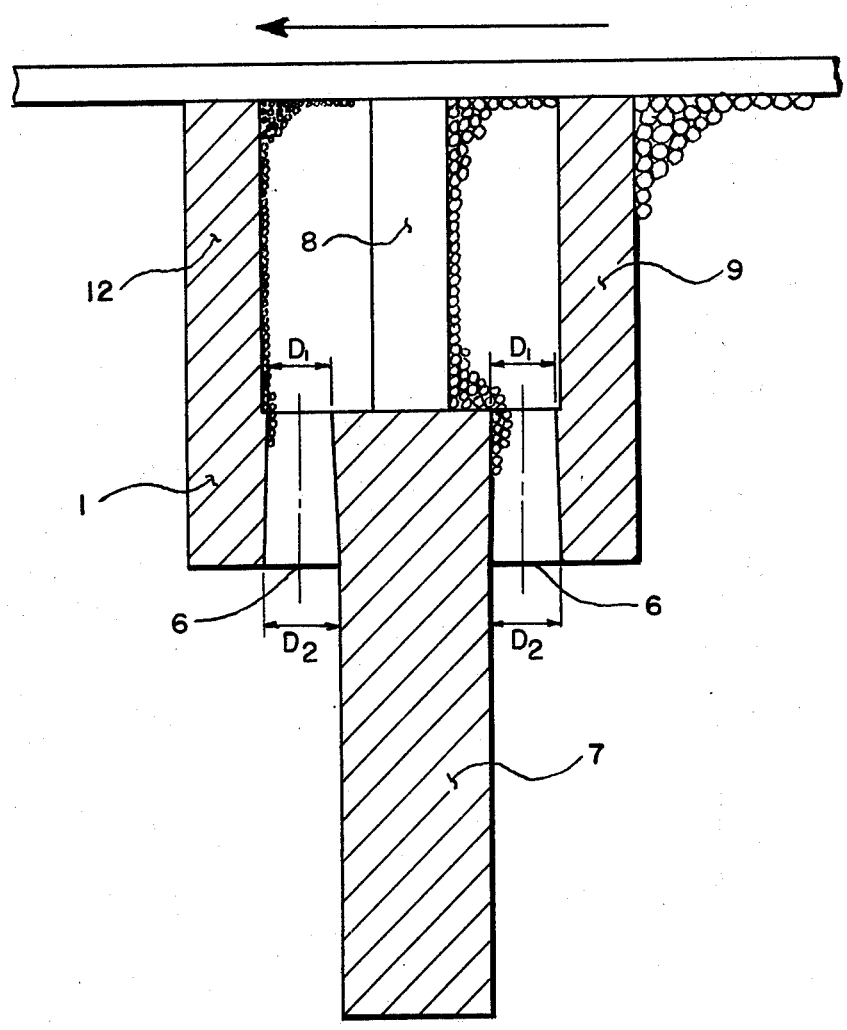
FIG. 2 is a cross-sectional view of the blade along A—A' of FIG. 1.

Referring now to FIG. 2, base 1 upon which tooth 12 of row 3, tooth 8 of row 4 and tooth 9 of row 5 are mounted, has a finite thickness through which holes 6 pass. These holes form cylinders, the diameter $D_1$ at the top of the base being smaller than diameter $D_2$ at the bottom of the base.

Figure 3:
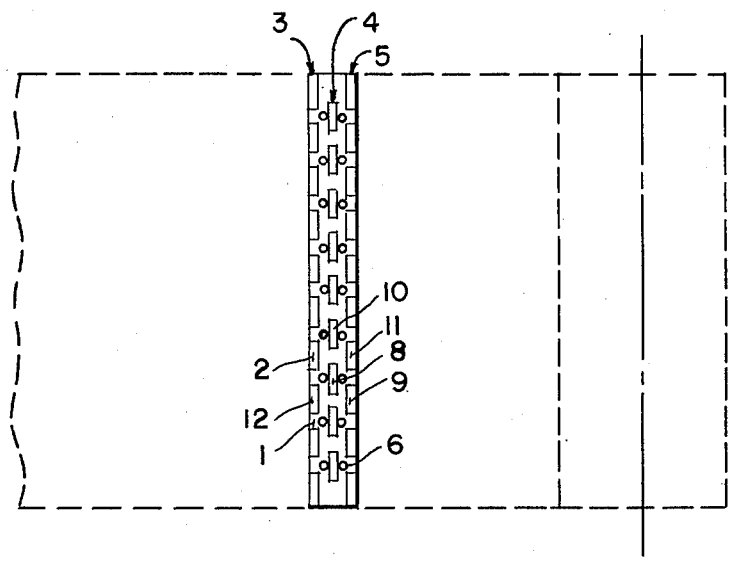
FIG. 3 is a diagramatic top view of the blade of FIG. 1 with belt apparatus shown by dotted lines.

FIG. 3 is another view showing the arrangement of teeth into rows with the series of holes between the rows of teeth.

Figure 4:
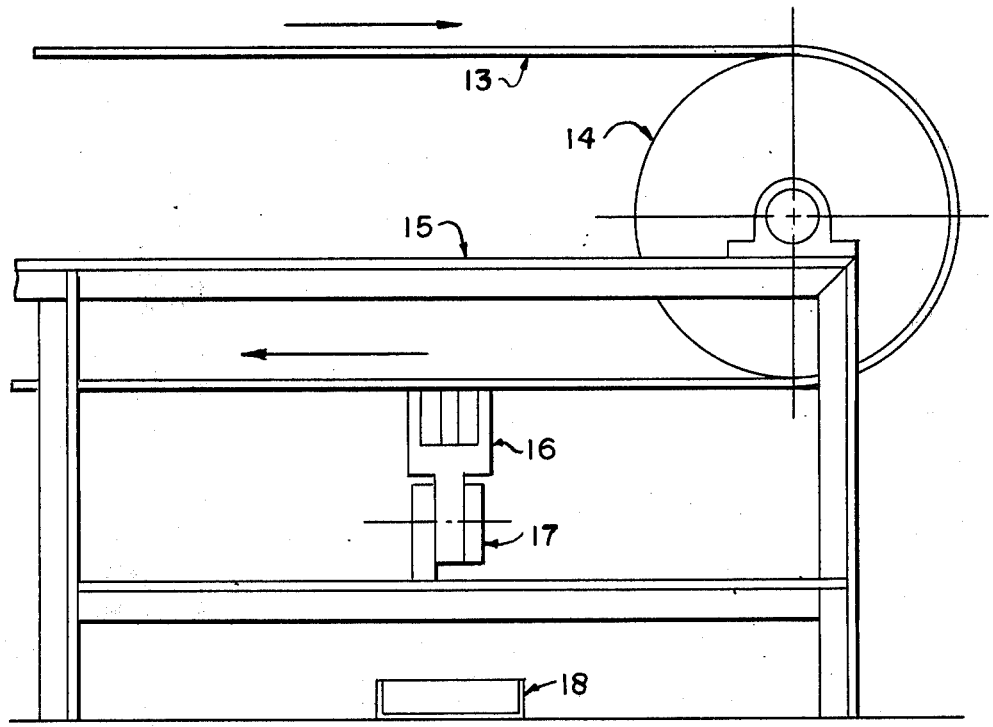
FIG. 4 is a diagramatic side view of the blade shown in conjunction with a conveyor belt.

Referring now to FIG. 4, belt 13 is shown moving in the direction of the arrows around drum 14. Drum 14 is attached to support frame 15 of a type generally known to the art. Blade 16 is shown supported by clamp 17 which clamp is itself attached to the lower portion of the support frame as shown. Receptacle 18 is shown which catches the waste material as it is scraped from its belt by the blade.

In general operation the blade is mounted on any standard blade holding device beneath a continuous conveyor belt. The build-up of cake may be quite substantial and, referring now to FIG. 2, tooth 9 breaks the cake and larger broken cake pieces fall from the belt. Of course wiping is not complete at this stage and cake material passes under blade 9 to be scraped by blade 8. Cake material scraped from the belt between teeth 8 and 9 would build up but for the hole 6 between the blades. The diameter at the top of the hole is smaller than the diameter at the bottom of the hole which helps to prevent clogging of the holes.

Any cake which remains after being wiped by the second row of teeth is wiped with the third row represented in FIG. 2 by tooth 12. Again any material wiped by this last row falls through the aperature between the row.

It is to be noted that the action of the teeth pressing against the belt cause a vibration of the teeth which aids in breaking the cake from the belt. The vibration not only aids in breaking the cake but also aids in clearing any cake build up on the blade.

The blade element the subject of this invention is usually made from a hard flexible material such as hard rubber or the like. It is usually manufactured from the same process as blades known to the art. It is envisioned that this balde may be manufactured from a molding process generally known in the art.

I claim:
1. A conveyor belt cleaner blade comprising:
   a. A base
   b. At least three rows of teeth permanently mounted on said base, said teeth being further arranged such that the teeth of one row oppose the space between the teeth of the adjacent row; and
   c. A plurality of holes through the base, said holes being located between the rows of teeth, said holes forming a truncated cone the diameter of the opening at the top of the base being smaller than the opening at the bottom of the base.
2. A cleaner blade as in claim 1 wherein the teeth are composed of hard rubber.
3. A cleaner blade as in claim 1 which comprises in addition a base support member attached to the base and between the rows of holes through the base.
4. A cleaner blade as in claim 3 wherein the base support member is a continuous piece running transversely across the base in the same directing as the rows of teeth.

* * * * *